United States Patent [19]

Corghi

[11] Patent Number: 5,689,069
[45] Date of Patent: Nov. 18, 1997

[54] METHOD AND APPARATUS FOR BALANCING VEHICLE WHEELS BY MEANS OF BALANCE WEIGHTS

[75] Inventor: Remo Corghi, Correggio, Italy

[73] Assignee: Corghi S.p.A., Correggio, Italy

[21] Appl. No.: 620,810

[22] Filed: Mar. 29, 1996

[30] Foreign Application Priority Data

Mar. 31, 1995 [IT] Italy .................... RE95A0016

[51] Int. Cl.$^6$ .................... G01M 1/38
[52] U.S. Cl. .................... 73/462; 301/5.21
[58] Field of Search ............ 73/462, 487, 460; 301/5.21

[56] References Cited

U.S. PATENT DOCUMENTS 4,267,730  5/1981  Curchod et al. .................... 73/462
5,471,874  12/1995  Rothamel et al. .................... 73/462

*Primary Examiner*—John E. Chapman
*Attorney, Agent, or Firm*—Birch, Stewart, Kolasch & Birch, LLP

[57] ABSTRACT

A vehicle wheel balancing method includes determining, by using an electronic computing device, the position of the application plane and the angular position of each weight within a range about prechosen balancing planes, computed on the basis of weight values chosen by the operator from a finite number of values available in practice. A wheel balancing apparatus includes a rotary shaft on which a vehicle wheel is mounted, and the electronic computing device discussed above.

9 Claims, 3 Drawing Sheets

METHOD AND APPARATUS FOR BALANCING VEHICLE WHEELS BY MEANS OF BALANCE WEIGHTS

BACKGROUND OF THE INVENTION

1. Field of the Invention

The present invention is directed to a method and an apparatus for balancing the wheels of a vehicle using balancing weights.

2. Description of the Background Art

For balancing motor vehicle wheels, machines are known including a rotary shaft on which the wheel is fixed, and including means for determining wheel unbalance data.

These machines are basically arranged to compute the values of the balance weights (two weights are usually required) after the operator has determined the position of the planes in which he intends to fit the weights (balancing planes).

The machine must therefore be informed of the axial position of the chosen balancing planes, i.e., the axial distance between a reference plane and the balancing planes themselves, plus the radial distance between the axis of rotation and the point (in the balancing plane) at which the balance weight is to be applied.

In traditional steel wheel rims, the balance weight application plane was assumed to coincide with the rim edges with the result that the chosen geometrical identification parameters were generally the distance between the inner side of the rim and the side of the machine casing (reference plane), the wheel rim width and its diameter.

With the increasing use of light alloy wheel rims, unsuitable for receiving traditional balance weights on their outer edges, there has arisen the requirement for applying weights to wheel rims in intermediate positions between their outer edges, with a corresponding need for machines able to implement such application.

For this purpose it is known to first determine and store the position of the chosen planes in which the relative balance weights are to be applied, and the radial distance between the point of application and the axis of rotation, all by means of a suitable geometrical position measurement device integrated into the machine.

An electronic computing unit then computes the exact value of the balance weights to be applied in the prechosen planes and their exact angular position in these planes.

The same measurement device can advantageously be used for this purpose.

The feeler member of the measurement device is moved along the surface on which the balance weights are to be applied, an acoustic/visual indicator indicating when the feeler has reached the computed position.

However, the described method has the drawback that the determined balance weight values generally do not coincide with the balance weights available to the operator in practice, because these latter are necessarily finite in number, and of a value usually a whole multiple of five grams.

Hence in practice the operator is compelled to round off the weight value in order to be able to use one of the weights available, with consequent balancing inaccuracy.

SUMMARY OF THE INVENTION

The above drawback is overcome by the present invention, which also determines and stores the position of the prechosen balancing planes for each balance weight, this being advantageously achieved by a geometrical position measuring device forming an integral part of the machine.

The balancing planes, which essentially represent the planes in which the machine computes the balance weights, are preferably determined according to the invention by determining two ranges within which the weight application planes must lie, the balancing planes being the central planes of said ranges.

After this, according to the invention, using electronic computing means, the position of the plane of application of each balance weight within the range about the relative prechosen balancing plane is determined on the basis of weight values chosen by the operator from those available to him, which are generally in multiples of five grams.

In a possible embodiment of the method according to the invention, after determining and storing the position of the range about the prechosen balancing planes for the balance weights (by means of the measurement device), a first computation is effected by electronic computing means to determine the value of the weights to apply in the relative prechosen planes.

A second computation is then effected by the computing means to determine the position of the planes of application of the balance weights within the range of the previously chosen balancing planes, on the basis of fixed weight values close to the values determined by the first computation and chosen from those available.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Figure 1:
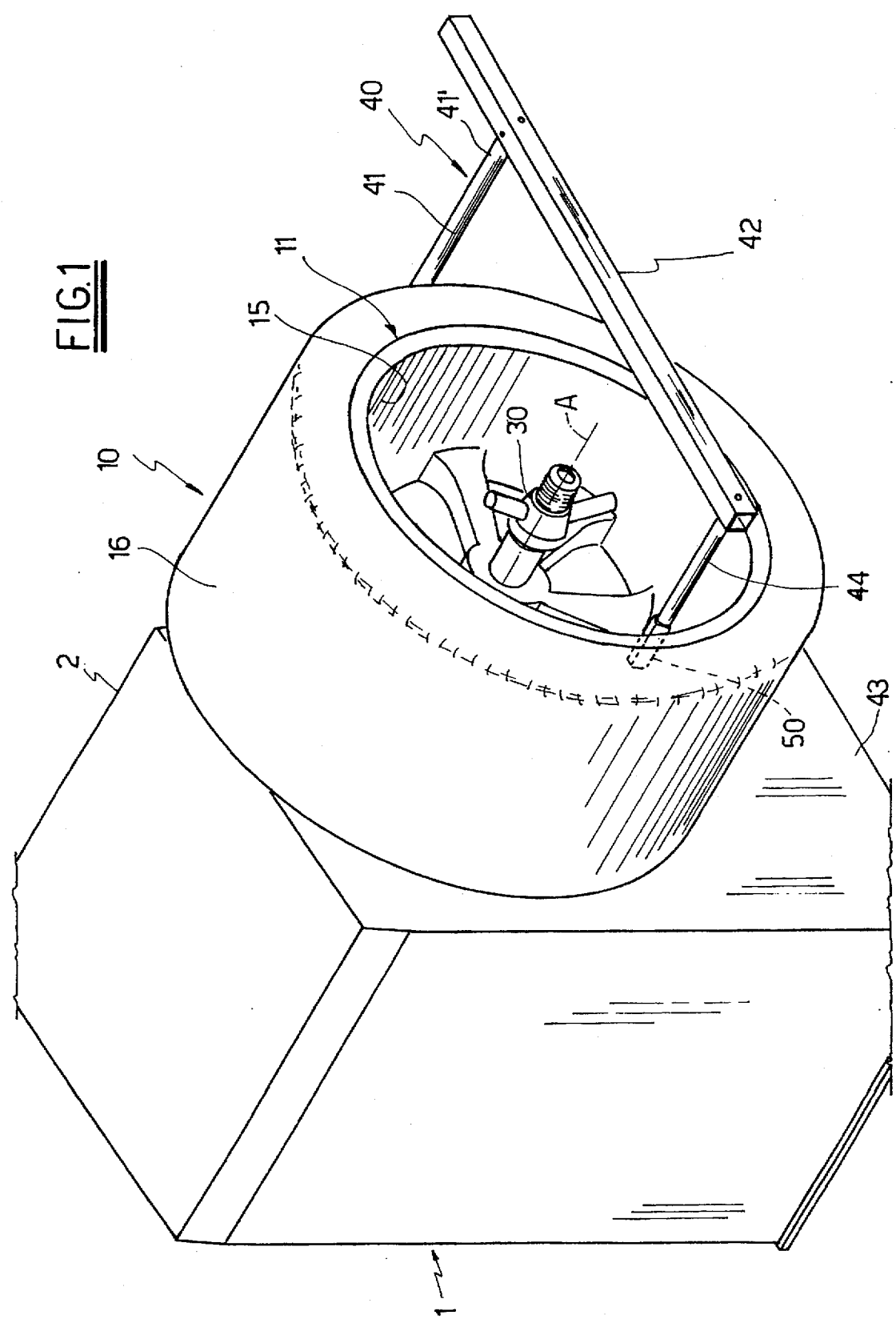
FIG. 1 is a perspective view of a wheel mounted on a balancing machine.
Figure 2:
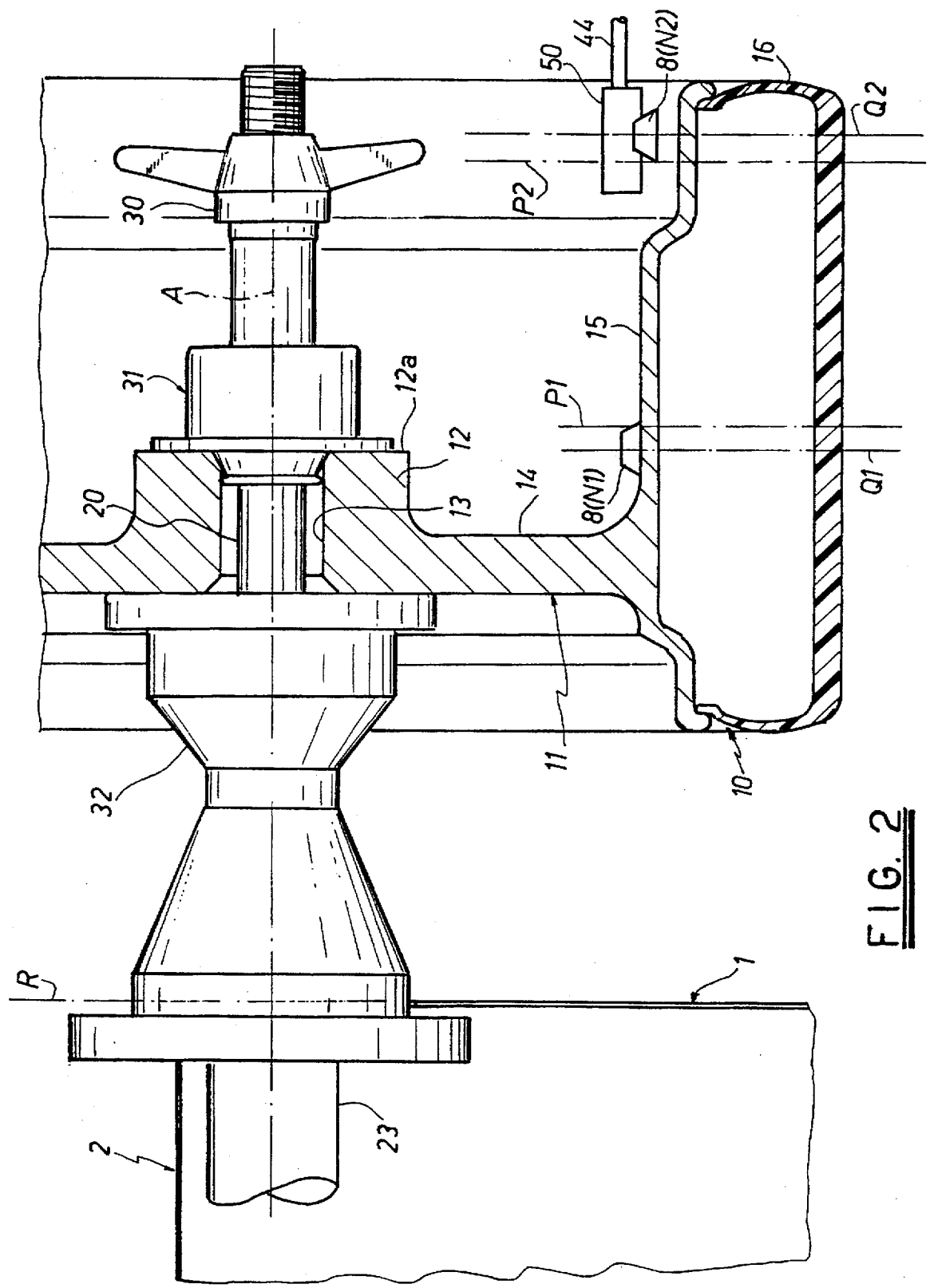
FIG. 2 is an axial section through a portion of the wheel of FIG. 1.

The machine, indicated overall by 1, comprises a fixed structure (or machine body) 2 from which the device for locking the wheel 10 (shown in FIG. 2) projects.

The wheel 10 comprises a rim 11 having a hub 12 with an axial hole 13 by which the wheel is fixed to the vehicle members.

The rim 11 has a radial portion (disc) 14 positioned closer to the outer side of the wheel (i.e., the side facing outwards when the wheel is mounted on the vehicle).

The hub 12 has a surface 12a exactly perpendicular to the axis of the wheel 10, acting as a reference surface in coupling the wheel to the relative vehicle members.

The substantially cylindrical portion (ring) of the rim 1 on which the tire 16 is positioned is indicated by 15.

The locking device comprises a motorized shaft 20 with a horizontal axis A on which the wheel 10 is fixed, projecting from the machine body 2. The shaft 20 is rigid with a motorized coaxial support shaft 23 emerging from the body 2.

By the use of clamping means 30, 31, 32 the wheel 10 is made rigid with the shaft 20 and positioned exactly centered on and perpendicular to the shift 20.

To the side of the locking device there is positioned a geometrical position measuring device 40 comprising a rod 41 arranged to the side of the wheel 10 and a a second rod 42 fixed to the free end 41' of the rod 41.

The rod 41 is parallel to the shaft 20 and is projectingly connected to the fixed structure 2 in such a manner as to be able to slide axially and to rotate about its own axis.

The rod 42 is positioned to the front of the wheel 10 and carries a stem 44 parallel to the shaft 20, at the free end of which there is arranged a feeler means 50 in a known fixed geometrical position relative to the rod 41. The stem 44 can penetrate axially into the cavity within the wheel rim such that the feeler 50 can reach almost any point on the inner cylindrical surface 15.

Figure 3:
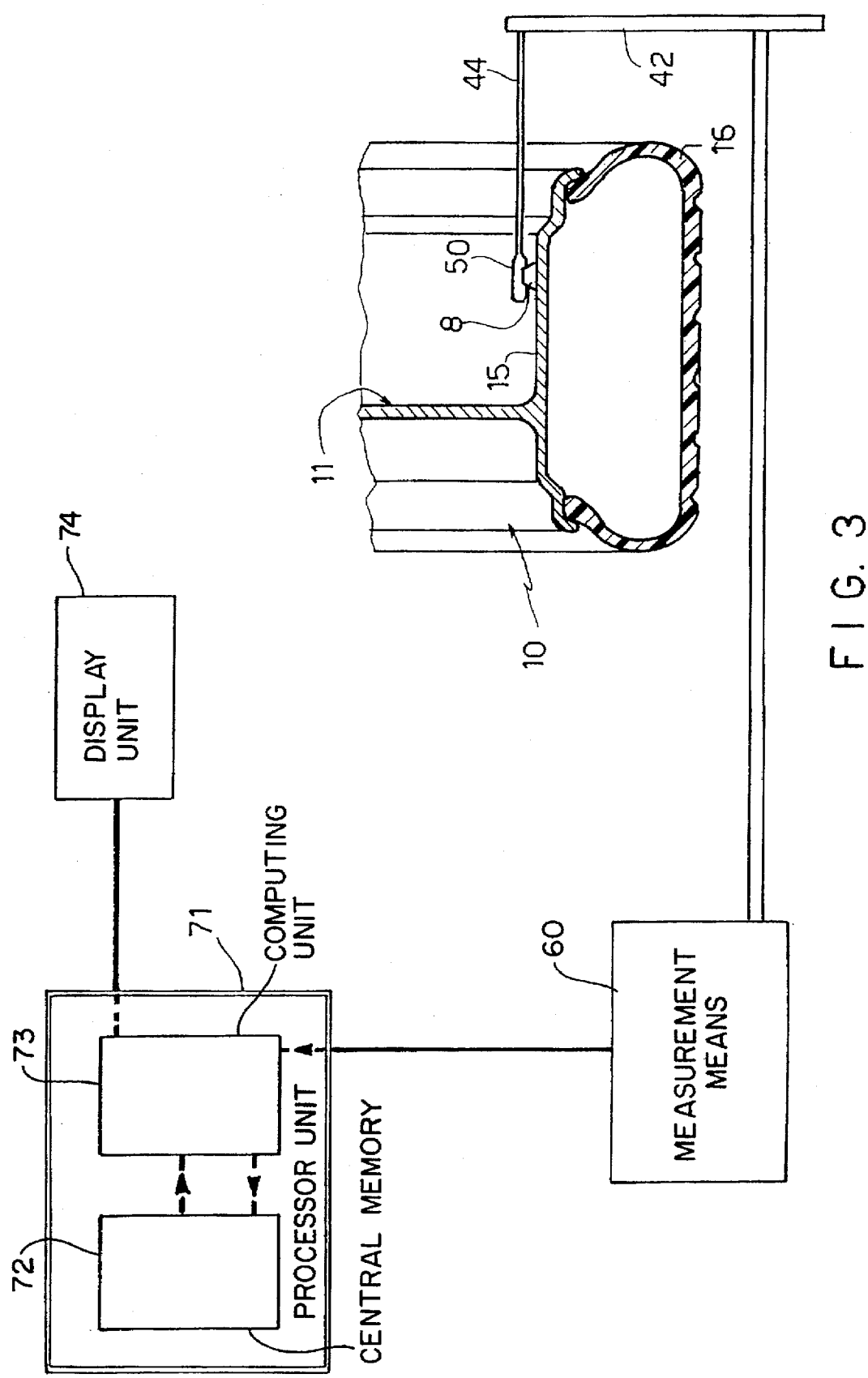
FIG. 3 is a block diagram of the machine.

Within the machine casing 43 there are positioned the measurement means 60 for measuring the axial position and the angular position of the rod 41 relative to the machine fixed structure 2. The data provided by the measurement means 60 are fed to a processor unit 71 which includes a central memory 72 and a computing unit 73 connected to a display unit 74 (FIG. 3).

According to the invention, after fixing the wheel 10 on the shaft 20, the geometrical positions of the two planes P1 and P2 prechosen as balancing planes, within a range about which the balance weight application planes Q1 and Q2 must lie, are determined and stored.

Advantageously according to the invention, two ranges known as P1MIN-P1MAX and P2MIN-P2MAX are determined, of each of which P1 and P2 are the central planes. Preferably these planes or ranges are chosen through cylindrical surface parts of the portion 15 on which the balance weights 8 can be easily located, in regions free from discontinuities which could hinder application of the weights 8.

The axial position of the planes P1 and P2, or of the relative ranges, is advantageously but not exclusively determined by the measurement device 40, by manually moving the feeler means 50 against the wheel rim surface in correspondence with each plane P1 and P2 or P1MIN, P1MAX, P2MIN, P2MAX and then recording in the memory 72 the data provided by the measurement means 60, i.e., the geometrical parameters of the measuring device 40 to which the distance of the defined planes from the reference plane R and the radial distance of the rim surface from the axis A correspond.

At this point the wheel is rotated and the computing means 73 determine (by well known relationships linking the various geometrical parameters and the unbalance force vectors measured by the usual transducers provided on the machine, to the value of the balance weights) the values M1 and M2 of the balance weights which need to be positioned in the planes P1 and P2 to balance the wheel, and the correct angular positions T1, T2 of these weights within the respective planes P1 and P2.

Often these weight values M1, M2 are different from the values of the weights available to the operator (any coincidence would be fortuitous), this latter, or the machine automatically, feeds into the computing unit other weight values N1 and N2 (close to the computed values M1 and M2) representing weights actually available to the operator, i.e., pertaining to a discrete series of weights the values of which are multiples for example of five grams.

The computing unit then effects a new computation to determine (on the basis of the said relationships linking the various geometrical parameters to the value of the balance weights) the geometrical position—i.e., the axial distance from the reference plane R—of other planes Q1 and Q2 in which to apply the balance weights of value N1 and N2, and their angular positions Z1, Z2 in these planes.

In short, new groups of weight-position-plane values N1-Z1-Q1, N2-Z2-Q2 are recomputed to replace the groups of values M1-T1-P1, M2-T2-P2 obtained by the first computation using traditional methods.

Because the value N1, N2 of the weights to be applied to the wheel rim is chosen by the operator or by the machine, in some cases the planes Q1 and Q2 may fall outside the range P1MIN-P1MAX and/or P2MIN-P2MAX. If this happens, the operator (or the machine) must repeat the procedure choosing two new weights N'1 and N'2 from those available to him.

Because of this, not only are the application planes always within those regions of the wheel rim surface on which the balance weights can be easily applied, but it is also possible to apply balance weights having exactly the theoretical balancing value.

Advantageously, the geometrical position of the application planes Q1 and Q2 can be identified by the measurement device 40.

This is achieved by manually moving the feeler means 50 carrying a balance weight 8 in front of the surface of the portion 15. When the weight 8 reaches the axial position of the application plane Q1, Q2, determined on the basis of the weight 8 and stored in central memory 72, the display unit 74 emits an optical signal.

The operator then fixes the weight 8 within this plane in the correct angular position, also identified by a signal on the display unit.

Numerous modifications of a practical and applicational nature can be made to the invention, but without leaving the scope of the inventive idea as claimed hereinafter.

The description of the computation systems has been omitted, as these are well known to the expert of the art.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

I claim:

1. A method for balancing vehicle wheels by means of at least one balance weight to be applied to the wheel rim, comprising the steps of:

determining and memorizing the position of a prechosen balancing plane and a balancing plane weight value;

determining an application plane weight value; and determining, by electronic computing means, the position of an application plane and an angular position for application of each balance weight weighting an amount equal to said application plane weight value within a relatively small range about the prechosen balancing plane computed on the basis of the application plane weight value.

2. The method as claimed in claim 1, wherein the position of the prechosen balancing plane is defined by choosing a range of values and defining the prechosen balancing plane centrally therebetween.

3. The method as claimed in claim 2, wherein a measurement device is used to indicate the position of the application plane.

4. The method as claimed in claim 2, further comprising the following steps:

performing a first computation, by said electronic computing means, to determine said balancing plane weight value to apply in the prechosen balancing plane; and performing a second computation, by said electronic computing means, to determine the position of the plane of application and the angular position of the balance weight within the aforesaid range, said second computation being effected on the basis of the application plane weight value close to the balancing plane weight value determined by the first computation.

5. The method as claimed in claim 4, wherein a measurement device is used to indicate the position of the application plane.

6. The method as claimed in claim 1, further comprising the following steps:

performing a first computation, by said electronic computing means, to determine said balancing plane weight value to apply in the prechosen balancing plane; and performing a second computation, by said electronic computing means, to determine the position of the application plane for application of the balance weight within a range about the prechosen balancing plane, said second computation being effected on the basis of the application plane weight value close to the balancing plane weight value determined by the first computation and chosen from a finite number of values available in practice.

7. The method as claimed in claim 6, wherein a measurement device is used to indicate the position of the application plane.

8. The method as claimed in claim 1, wherein a measurement device is used to indicate the position of the application plane.

9. An apparatus for balancing a vehicle wheel by applying at least one balance weight, comprising:

a rotary shaft mounted on a base;

means for clamping the wheel onto said rotary shaft;

means for measuring centrifugal forces of said rotary shaft in at least two reference planes;

means for computing unbalance of the wheel; and means for computing a balancing plane weight value for a balance weight to be applied in a predetermined balancing plane of the wheel at a first angular position computed by the computing means, wherein the computing means comprises a memory for storing unbalance data, processor means for computing an application plane and a second angular position of an application plane balance weight chosen by the operator from a finite number of values available in practice, and a position transducer operably connected with said processor means and arranged to indicate said application plane and said second angular position.

* * * * *